Nov. 9, 1954 W. E. GOULD 2,693,815
VALVE
Filed Aug. 19, 1949 2 Sheets-Sheet 1
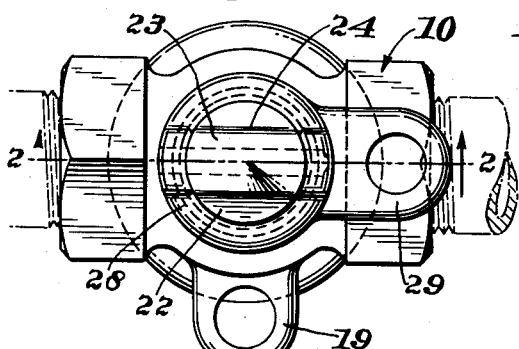
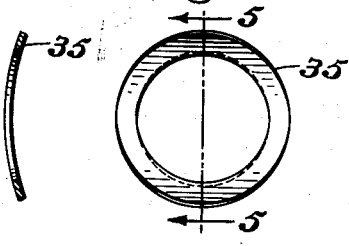
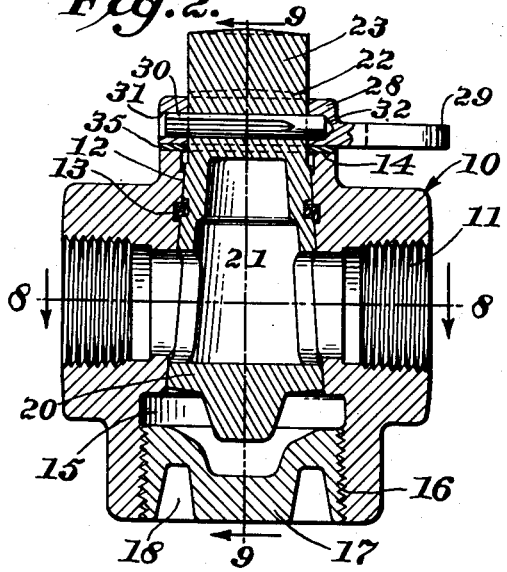
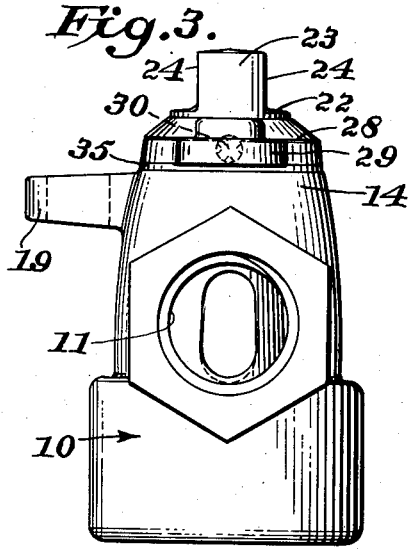
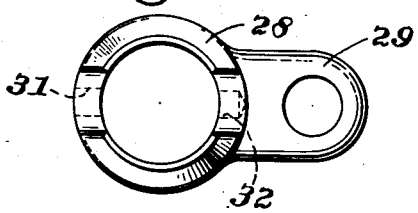
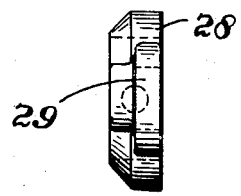
INVENTOR:
Wallace E. Gould,
BY
Cushman, Darby & Cushman
ATTORNEYS.

Nov. 9, 1954  W. E. GOULD  2,693,815
VALVE
Filed Aug. 19, 1949  2 Sheets-Sheet 2

INVENTOR:
Wallace E. Gould,
BY
Cushman, Darby & Cushman
ATTORNEYS.

United States Patent Office 2,693,815
Patented Nov. 9, 1954

2,693,815

VALVE

Wallace E. Gould, Decatur, Ill., assignor to Mueller Co., Decatur, Ill., a corporation of Illinois Application August 19, 1949, Serial No. 111,170

5 Claims. (Cl. 137—385)

The present invention relates to valves. This application is a continuation-in-part of my copending application Serial No. 787,940, filed November 25, 1947, and now abandoned.

Objects of the invention are to provide a valve which can be produced at low cost and is of optimum simplicity and efficiency. Other objects and advantages of the invention will be apparent from the following specification and accompanying drawings wherein:

Figure 1 is a plan view looking toward Figure 2 from the top of the latter figure;

Figure 2 is an axial section on the line 2—2 of Figure 1;

Figure 3 is an elevation looking toward Figure 1 from the right;

Figure 4 is a plan view of a spring element;

Figure 5 is a section on the line 5—5 of Figure 4;

Figure 6 is an elevation of a collar included in the valve;

Figure 7 is a side view of the collar of Figure 6;

Figure 8:
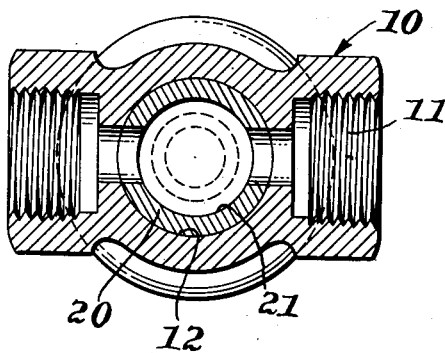
Figure 8 is a transverse section on the line 8—8 of Figure 2.
Figure 9:
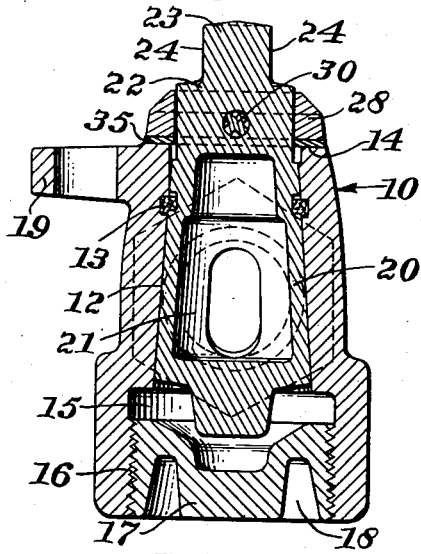
Figure 9 is an axial section on the line 9—9 of Figure 2.

The numeral 10 designates a casing or body provided with a flow line 11 and a seat bore 12 extending at right angles to the flow line. The seat bore is preferably tapered and will include lubricant grooves such as generally indicated at 13. The smaller end of the seat bore terminates at a flat transverse and annular surface 14 and the larger end of the bore opens to a lubricant chamber 15 having its outer portion threaded as indicated at 16 to receive a closure 17. Closure 17 may be provided with a recess 18 of such form that it can be engaged by a tool. If the valve is of the locking type, casing 10 will be provided with an apertured arm 19 extending radially therefrom at the end nearest the smaller end of the seat.

The plug 20 is provided with a flow passage 21 and also may be provided with suitable grooves for lubricant so that lubricant may move from lubricant chamber 15 to the lubricant groove 13 and to the portions of the seating surface.

Figure 10:
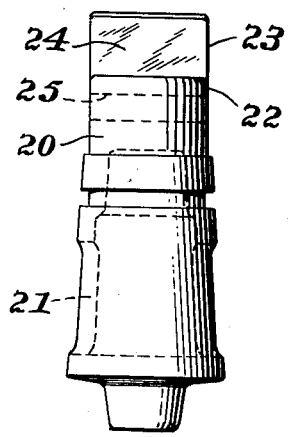
Figure 10 is an elevation of a plug which may be used in the valve.
Figure 11:
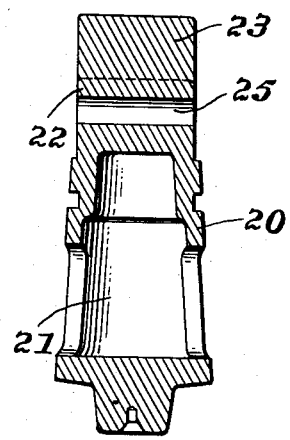
Figure 11 is an axial section through the plug.

A shank 22 projects from the smaller end of the plug, the shank being of substantial length and having its outer portion 23 suitably flattened as at 24 on one or more sides to receive an operating tool. Shank 22 is circular inwardly of the portion 23, and a radial aperture 25 extends through the circular portion, this aperture preferably being parallel to one of the flat faces 24. As is indicated in Figures 10 and 11, the circular portion of shank 22 is of sufficient axial length as compared to the diameter of the aperture 25 to avoid weakening of the shank by the presence of the aperture.

A collar or abutment 28 is seated on the circular portion of the shank 22, the collar being shown in detail in Figures 6 and 7. If the valve is of the lock type, collar 28 is provided with an apertured arm 29. When the plug is closed, arm 29 will be in alignment with casing arm 19 so that a seal or padlock may be passed through the two arms.

The collar or abutment 28 is secured to the shank by means of a pin 30 which extends through an aperture 31 in one side of the pin, then through the aperture 25 of the shank and finally into a socket 32 in the opposite side of the collar. The pin may be fluted to prevent its ready removal.

If the collar is of the type shown in Figures 6 and 7 and, therefore, includes an arm 29, the apertures 31 and 32 in the collar will lie on a radial line lying within the lines defining the lateral edges of arm 29. Also, the apertures 31 and 32 lie substantially within the radial bounding planes of arm 29. By this arrangement, the pin 30 cannot be backed out readily upon drilling into the aperture or socket 32 except by drilling substantially or entirely through the length of the arm 29.

Figure 12:
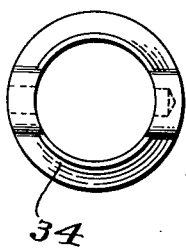
Figure 12 is a detail view showing a modified form of collar which may be used with the valve.

If the valve is a non-locking valve, a collar 34 such as shown in Figure 12 and which includes no arm 29 will be provided. The collar 34 is otherwise of the same formation as the collar 28.

A resilient washer 35 is positioned between the inner face of the collar 28 or 34 and the flat surface 14 of the casing. Figures 4 and 5 indicate the formation of the washer 35 when it is not under compression, and it will be noted from these views that the washer is bowed along a diametrical line. However, when the washer is in position upon the valve with the collar 28 secured on the shank and the plug seated, washer 35 will be substantially flat. The washer thereby exerts pressure upon the collar 28 to urge the plug to seated position. Nevertheless, the slight bow which still exists in the washer will enable the plug to be moved axially inwardly of the casing seat, as by a blow upon the outer end of shank 22 to overcome any seizure of the plug. During such unseating movement of the plug, the fact that the larger end of the plug will be forced into lubricant chamber 15 will cause lubricant to be displaced from that chamber and into the lubricant grooves and seating surface so that the plug can be freely turned. The action of the resilient washer 35 in tending to resume its normal form will reseat the valve immediately after it has been slightly unseated by a blow or tap as described above.

The provision of the resilient member 35 and collar or abutment 28 at the smaller end of the plug will prevent the plug from dropping from the casing in the event that the lubricant closure 17 is removed. The present valve is primarily intended as a gas meter stop. Such valves may remain unoperated for a number of years and eventually may become seized. When the valve is to be operated, it is usual to remove the closure 17 to make certain, before tapping the valve, that an adequate supply of lubricant is in chamber 15. Without the collar 28 and resilient element 35, the plug could entirely fall from the casing if the plug actually is not seized.

A particular advantage of having the shank 22 extend outwardly beyond the collar 28 is that any blow applied to the valve to unseat the plug must thereby be applied to the shank 22 which is integral with the plug and hence formed of bronze, rather than a more brittle metal such as cast iron. In addition, it will be noted that the pin 30 lies within the bounding planes of the flattened portion 23 of shank 22 and a substantial thickness of the circular portion of the shank is disposed axially outwardly of pin 30. Because of this, when the outer end of the shank is struck by a hammer to unseat the plug, there is no possibility of the shank fracturing crosswise adjacent the pin. It will be appreciated that unless the above indicated reinforcement is provided, a blow upon the shank which brings the collar 28 and spring 35 into firm contact with the casing could result in breakage of the shank adjacent the pin. The pin 30, being of steel, also braces the collar 28 or 34 against breakage if the collar is of cast iron.

The terminology used in the specification is for the purpose of description and not of limitation, the scope of the invention being defined in the claims.

I claim:

1. In a valve the combination comprising: a casing including a flow line and a seat extending transversely of said line; a plug rotatable in said seat; an apertured radially-projecting arm at one end of said casing; a shank projecting axially from the corresponding end of said plug; a handle element for said plug including a portion surrounding said plug shank and an apertured radially-projecting arm, the apertures in said arms being adapted to be aligned for the reception of a locking device; and means for securing said handle element to said plug comprising a pin extending tightly through one side of said surrounding portion of said handle element, through said plug shank, and into a blind socket in the other side of said surrounding portion adjacent the base of said handle element arm, said pin being substantially in diametrical alignment with said handle element arm, one end of said pin terminating within said socket and the other end of said pin terminating within said one side of said surrounding portion of said handle element.

2. In a valve the combination comprising: a casing including a flow line and a tapered seat extending transversely of said line; an apertured arm projecting radially from said casing adjacent the smaller end of said seat; a tapered plug rotatable in said seat; a shank projecting from the smaller end of said plug; a handle element including a portion surrounding said plug shank and an arm extending radially with respect to the plug axis, the last-mentioned arm having an aperture therein arranged to be aligned with the aperture in said casing arm for the reception of a locking device; and a pin extending tightly through one side of said surrounding portion of said handle element, through said shank, and into a blind socket in the other side of said portion adjacent the base of said handle element arm, said pin lying substantially within the transverse outline of the base of said handle element arm, one end of said pin terminating within said socket and the other end of said pin terminating within said one side of said surrounding portion of said handle element.

3. In a rotary plug valve the combination comprising: a casing including a flow line and a tapered seat extending transversely of said line; a tapered plug rotatable in said seat; a shank on the smaller end of said plug projecting outwardly beyond said casing, said shank having an inner circular portion and an outer non-circular impact-receiving and turning-tool engaging portion confined substantially within the peripheral outline of said circular portion; an apertured arm projecting radially from said casing adjacent the smaller end of said seat; a collar surrounding said circular shank portion; an apertured radial arm on said collar, the apertures in said arms being adapted to be aligned for the reception of a locking device; and a pin extending diametrically and tightly through one side of said collar, through said shank, and into a blind socket in the other side of said collar adjacent the base of said collar arm, said pin lying substantially within the transverse outline of the base of said collar arm, one end of said pin terminating within said socket and the other end of said pin terminating within said one collar side.

4. In a rotary plug valve the combination comprising: a casing including a flow line and a tapered seat extending transversely of said flow line; a tapered plug rotatable in said seat; means for retaining said plug in engagement with said seat comprising an integral shank on the smaller end of said plug projecting outwardly beyond said casing and having an inner circular portion of substantially the same diameter as said plug smaller end, a collar surrounding said circular shank portion, a pin extending diametrically and tightly through one side of said collar, through said shank, and into a blind socket in the other side of said collar, one end of said pin terminating in said socket and the other end of said pin terminating within said one collar side, and a compression spring washer surrounding said shank and interposed between said collar and the corresponding end of said casing, said washer being compressed almost flat; and a non-circular impact-receiving and turning-tool-engaging portion on said shank extending outwardly for an appreciable distance beyond said circular portion and confined within the peripheral outline thereof.

5. The structure defined in claim 4 wherein the non-circular shank portion comprises an extension of the circular portion having a pair of flat opposite sides extending parallel to the pin.

References Cited in the file of this patent

UNITED STATES PATENTS

| Number | Name | Date |
|---|---|---|
| 1,156,963 | Woods | Oct. 19, 1915 |
| 1,185,180 | Close | May 30, 1916 |
| 1,224,959 | Rosenfeld | May 8, 1917 |
| 1,584,699 | Davenport | May 11, 1926 |
| 2,065,726 | Nordstrom | Dec. 29, 1936 |
| 2,133,580 | Searle | Oct. 18, 1938 |
| 2,342,664 | Haessler | Feb. 29, 1944 |
| 2,586,453 | Bradbury | Feb. 19, 1952 |

FOREIGN PATENTS

| Number | Country | Date |
|---|---|---|
| 149,382 | Great Britain | 1919 |